July 25, 1950  H. G. PACK  2,516,719
THERMOELECTRIC GENERATOR
Filed June 5, 1947
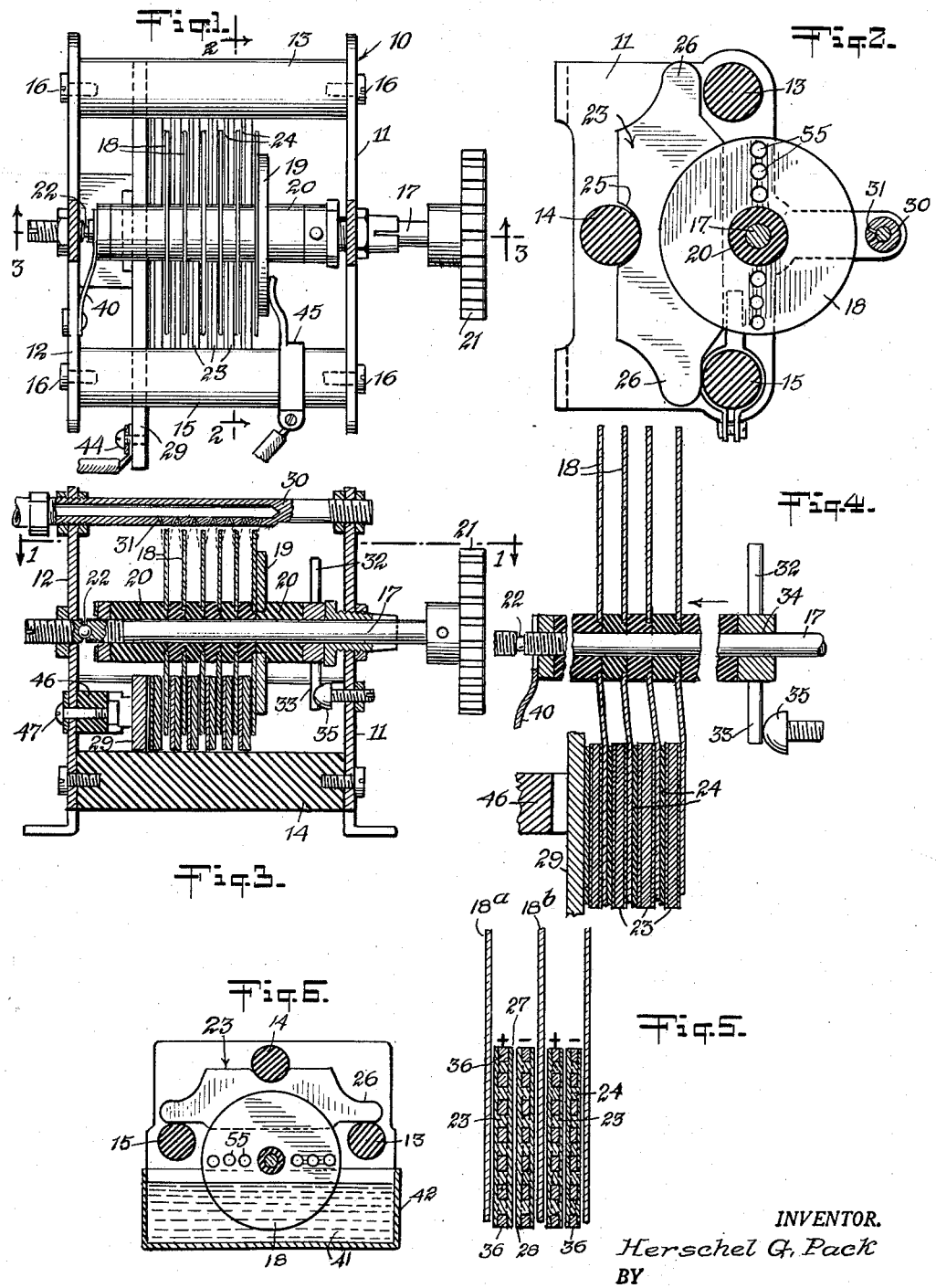
INVENTOR.
Herschel G. Pack
BY
Munn, Liddy & Glaccum
Attorneys Patented July 25, 1950

2,516,719

UNITED STATES PATENT OFFICE 2,516,719

THERMOELECTRIC GENERATOR

Herschel G. Pack, San Mateo, Calif.

Application June 5, 1947, Serial No. 752,659

7 Claims. (Cl. 136—4)

1

My invention relates to thermo-electric generators and, more particularly, to a device of this type that converts thermo energy into electrical energy through new and novel means.

My principal objective was to design and construct a thermo-electric generator that would have a very low ohmic resistance and, therefore, greater current capacity than those generators of similar type on the market today.

My invention is particularly adapted for work requiring a heavy direct current such as for electro-chemical processes or for spot or butt welding.

An advantage of my device is that it is capable of generating a current of considerable amperage at a practical working voltage.

A further advantage is that through the utilization of moving parts which, to my knowledge, have not been incorporated before in a thermoelectric generator, I have constructed a device of high thermal efficiency.

Further advantages and unique features of my invention will be apparent as I proceed with the description.

With reference to the drawings—

Fig. 1 shows a sectional view on line 1—1 of Fig. 3;

Fig. 2 shows a sectional view on line 2—2 of Fig. 1;

Fig. 3 shows a sectional view on line 3—3 of Fig. 1;

Fig. 4 shows an enlarged sectional view of the heat transfer members and elements illustrating their position during the generation of electrical energy;

Fig. 5 shows an enlarged sectional view of the heat transfer members and elements; and Fig. 6 shows a further modification of my thermo-electric generator.

In Fig. 1 I show my thermo-electric generator 10 which is mounted in a frame consisting of front and rear plates 11 and 12, respectively, and three longitudinal ceramic rods 13, 14 and 15 secured at each end to the plates 11 and 12 and supporting a portion of the working parts of the thermo-electric generator 10. The rods 13, 14 and 15 are solid throughout their length and are secured to the end plates 11 and 12 through screws 16. Mounted between and centrally supported by plates 11 and 12 is a metal shaft 17 on which is mounted a plurality of thin metal discs or heat transfer members 18. Also mounted on the shaft 17 is a circular metal plate 19 which is in direct contact with the first heat transfer member 18 and serves as one of the electrical terminals for the output of the thermo-electric

2 generator 10. All of the heat transfer members 18 are insulated from the shaft 17 and are held in spaced relation from each other by mica or ceramic washers 20. The heat transfer members 18 rotate with the shaft 17 which may be operated either manually by turning the knob 21 or by connecting the shaft 17 to suitable driving means such as a motor. To facilitate the rotation of the shaft 17, the end nearest the rear plate 12 is equipped with an adjustable anti-friction bearing 22 and a tension spring 40.

Positioned on each side and in contact with the lower portion of the heat transfer members 18 are the positive and negative elements 23 and 24, respectively, of the electrical series. As shown in Fig. 2, the positive and negative elements 23 and 24 are irregular in shape with their width being several time their height and having a very small thickness. A centrally located groove 25 is located in the bottom edge of the elements and rounded projections 26 extend from their sides. When assembled, the elements 23 and 24 are supported by rod 14 which engages in groove 25. The rods 13 and 15 are mounted above the side projections 26 of the elements 23 and 24 and serve to maintain the elements in alignment. A heavy metal bar 29 is held in close contact with the last element of the electrical series by insulator 46 and screw 47 and acts as the other terminal for the electrical circuit.

An electrical generating unit comprises a plate of material which is negative to the heat transfer member 18 in the thermo-electric series and is in contact with one side of the member 18 while on the other side of the heat transfer member 18 is an element which is positive to the heat transfer member. A plurality of these units may be provided in series arrangement to produce the desired electromotive force. Cold junctions necessary for the generation of thermoelectric currents are formed at the boundaries of the units. For example, as shown in Fig. 5, the side 27 of the positive element 23 opposite the heat transfer member 18a is in contact with the side 28 of the negative element 24 of the next unit opposite its heat transfer member 18b. It will be seen that even though that the heat transfer members 18 are relatively thin discs, it is possible to have hot and cold junctions because heat is applied only by the heat transfer members 18 and with efficient materials there will always be a considerable difference of temperature between the hot and cold junctions. Good element materials are relatively poor conductors of heat while the heat transfer members 18 are relatively good conductors of heat allowing the temperature of the heat transfer members 18 to drop slowly with a gradual falling off of the electromotive force.

As shown in Fig. 3, mounted above the heat transfer members 18 and supported by the front and rear plates 11 and 12 is a fuel supply pipe 30 with openings or burners 31 directed towards both sides of the upper halves of the heat transfer members 18. Suitable fuel such as gas or oil may be passed through this pipe 30 and by means of the openings or burners 31 the upper halves of the heat transfer members 18 will be heated. In their normal position, the assembly of the positive and negative elements 23 and 24 and the heat transfer members 18 is loosely held together. However, as the shaft 17 is rotated, two pins 32 and 33, respectively, which are mounted 180° apart in a collar 34 on the shaft 17, contact a cam-like rounded projection 35 disposed in the path of the pins. This causes a resultant axial movement of the shaft 17 and heat transfer members 18 each time the pins contact the projection 35 which is adapted to engage either of the pins during each 180° of rotation. When either of the pins 32 or 33 engages on the projection 35 which is secured to the lower part of the front plate 11, the heat transfer members 18 move slightly toward the rear plate 12 resulting in the heat transfer members 18 and the elements 23 and 24 being compressed in tight relation to each other. At this point current is being delivered to the external circuit using the round plate for one terminal and the other terminal being the heavy piece of metal 29 which is held against the last element.

In order to prevent a ready flow of heat between the upper and lower halves of the heat transfer members 18, the members 18 have a series of holes 55 drilled across their diameters. Therefore, while the upper halves of the heat transfer members 18 are receiving heat, the heat which has been stored in the lower halves is being converted into electrical energy. The electromotive force is at its highest at the instant the assembly of elements and heat transfer members are forced together. When the voltage has dropped to a predetermined value, the shaft 17 may be rotated 180° bringing the newly heated halves of the heat transfer members 18 into generating position and exposing the recently used halves to the source of heating. It can be seen that by repeating this cycle the generation of electromotive force may be constant. To obtain a more uniform flow of current, two or more generators may be connected in parallel and the timing set so that the electromotive force of one will be highest when that of the other is at a minimum.

The positive and negative elements 23 and 24 are of identical construction except for the activating material. In forming these elements a sheet of perforated brass or other metal sheeting 36 is molded to the proper shape. Then the sides or coating of activating material 27 and 28, respectively, is applied to fill the perforations and to bring the positive element 23 and negative element 24 to a desired thickness. The perforated metal sheet 36 acts primarily as a grid or frame to hold the active materials 27 and 28 as the active materials, in general, are brittle and not sufficiently strong when formed into thin sheets. Examples of negative element materials 28 are bismuth and lead sulphide; while examples of positive element materials 27 are copper sulphide and an alloy of antimony zinc. The most difficult obstacle to overcome in my invention is the contact resistance between the positive and negative elements. Since it is desirable to utilize elements of such materials as antimony zinc alloy, cooper sulphide, lead sulphide, etc. on a metal grid in order to obtain high output and efficiency from the generator, it is desirable to reduce their normally high contact resistance to as low a level as possible. The best way to accomplish this is to thoroughly clean each side of the element and coat it with a metal. If this metal is the same as that of the surface against which it is to press and is thin, it will not interfere with the normal thermo-electric action and, at the same time, it will greatly reduce the contact resistance and corrosive action. It is of course important that only the flat surfaces are coated and that there is no conductive path between the surfaces of the individual elements except through the element material.

While I have stressed the use of elements made from built up materials on a perforated frame, one or both of the positive or negative elements (hereinafter described) may be made of sheet metal. In such an arrangement where the heat transfer elements 18 are also of stainless steel, the negative element would be neutral and an electromotive force would be generated between the heat transfer element and the alloy element but not between the heat transfer member and the metal element. A suitable metal for the heat transfer members 18 is Monel metal and another is stainless steel. Material for these members should be chosen for their ability to withstand heating without excessive deforming or corrosion. Where corrosion is a major problem, the heat transfer members may be plated with an inert metal such as platinum but for all practical purposes, Monel metal is satisfactory.

Any one of a number of ways of heating the heat transfer members may be employed but the most satisfactory would be a gas burner running horizontally along the length of the generator with a flame opening on each side of each transfer member as above described thus directing a flame equally on each side. Such equal and even heating would also prevent warping of the heat transfer members. Since in any position except the one where the entire assembly is compressed together, the elements rest loosely together and they may be further cooled, if desired, by blowing air through and around them, which procedure would somewhat expedite the heating cycle.

As shown in Fig. 6, it will be seen that the generator 10 may be turned upside down over a vessel 42 so that the heat transfer members 18 dip into a fluid 41 such as oil. This would enable them to receive heat from a liquid source and a thermo-couple of zinc antimony alloy and bismuth or other metal will generate its maximum electromotive force at a temperature well within the safe heating range of a number of available heating fluids.

It is also well known that a thermo-couple is reversible. That is, when current is passed through a junction of dissimilar metals, lowering of the temperature at the junction results. With reference to Fig. 6, it can be seen that my invention, like any other thermo-electric device, can be used to produce cold by sending an electric current through the series of junctions in the proper direction. This makes it possible to transfer the cold to a liquid where it can be utilized, such process being capable of being repeated over and over again.

As my generator 10 is capable of producing currents of high magnitude at practical working voltages, the terminals 19 and 29 are of heavy metal. Whereas terminal 29 will be stationary, an electrical conductor 44 may be easily connected thereto. The connection to terminal 19 must be made through a sliding contact 45 due to the fact that the terminal 19 rotates. It should be realized that I have shown my device in its preferred form and that other suitable means may be utilized for making the electrical connections to the working elements. Also, any number of generating units may be connected in series depending on the amount of current desired.

While the invention has been described in detail with respect to a present preferred form which it may assume, it is not to be limited to such details and form since many changes and modifications may be made in the invention without departing from the spirit and scope of the invention in its broadest aspects. Hence, it is desired to cover any and all forms and modifications of the invention which may come within the language or scope of any one or more of the appended claims.

I claim:

1. In a thermo-electric generator, a plurality of pairs of stationary thermo-electric elements, each pair consisting of a positive element and a negative element, a plurality of rotatable heat transfer members disposed between each positive and negative element, means for applying heat to a portion of said heat transfer members, and means to bring said heated portion in contact with said positive and negative elements whereby the transfer of heat from the heat transfer members to the elements is effected, causing an electrical current to be generated.

2. In a thermo-electric generator, a plurality of pairs of stationary thermo-electric elements, each pair consisting of a positive element and a negative element, a plurality of rotatable heat transfer members, said heat transfer members being circular in shape with the lower halves thereof disposed between a positive and negative element, means for applying heat to a portion of said heat transfer members, and means to bring said heated portion in contact with said positive and negative elements whereby the transfer of heat from the heat transfer members to the elements is effected, causing an electrical current to be generated.

3. A thermo-electric generator including a stationary frame, heat transfer members, and pairs of thermo-electric elements, said frame comprising spaced end plates connected by rods, a rotatable shaft centrally positioned with respect to and supported by said end plates, said heat transfer members being circular in shape and adapted to rotate with said shaft, said pairs of elements comprising laterally spaced positive and negative elements, the lower halves of said heat transfer members being disposed between a positive and negative element, means to heat the upper halves of said heat transfer members, rotative means to bring said heated halves in contact with said positive and negative elements, and means operated by said rotative means to force said elements and the lower halves of the heat transfer members in close contact with each other whereby the transfer of heat from the heat transfer members to the elements is effected, causing an electromotive force to be generated.

4. A thermo-electric generator including a stationary frame, heat transfer members, and pairs of thermo-electric elements, said frame comprising spaced end plates connected by rods, a rotatable shaft centrally positioned with respect to and supported by said end plates, said heat transfer members being circular in shape and adapted to rotate with said shaft, said pairs of elements comprising laterally spaced positive and negative elements, the lower halves of said heat transfer members being disposed between a positive and negative element, means to heat the upper halves of said heat transfer members, rotation of said shaft causing the heated halves of said heat transfer members to contact the positive and negative elements, a pin in said shaft, and cam-like means on the frame in the path of the pin to be contacted thereby to cause axial movement of said shaft, compressing said elements and lower halves of the heat transfer members together whereby the transfer of heat from the heat members to the elements is effected, causing an electromotive force to be generated.

5. A thermo-electric generator including a stationary frame, heat transfer members, and pairs of thermo-electric elements, said frame comprising spaced end plates connected by rods, a rotatable shaft centrally positioned with respect to and supported by said end plates, said heat transfer members being circular in shape and adapted to rotate with said shaft, said pairs of elements comprising laterally spaced positive and negative elements, the lower halves of said heat transfer members being disposed between a positive and negative element, means to heat the upper halves of said heat transfer members, the rotation of said shaft causing the heated halves of the heat transfer members to contact the positive and negative elements, a pin on said shaft, a rounded projection on said frame in the path of the pin to contact therewith to cause axial movement of said shaft, compressing said elements and lower halves of the heat transfer members together whereby the transfer of heat from the heat members to the elements is effected, causing an electromotive force to be generated.

6. A thermo-electric generator including a stationary frame, heat transfer members, and pairs of thermo-electric elements, said frame comprising spaced end plates connected by rods, a rotatable shaft centrally positioned with respect to and supported by said end plates, said heat transfer members being circular in shape and adapted to rotate with said shaft, said pairs of elements comprising laterally spaced positive and negative elements, the lower halves of said heat transfer members being disposed between a positive and negative element, means to heat the upper halves of said heat transfer members, the rotation of said shaft causing the heated halves of the heat transfer members to contact the positive and negative elements, pins secured to said shaft and spaced 180° apart, a rounded projection on the frame in the path of said pins to be engaged thereby to cause axial movement of said shaft, compressing said elements and lower halves of the heat transfer members together whereby the transfer of heat from the heat members to the elements is effected, causing an electromotive force to be generated.

7. A thermo-electric generator including a stationary frame, heat transfer members, and pairs of thermo-electric elements, said frame comprising spaced end plates connected by rods, a rotatable shaft centrally positioned with respect to and supported by said end plates, said heat transfer members being circular in shape and adapted to rotate with said shaft, said pairs of elements comprising laterally spaced positive and negative elements, the lower halves of said heat members being disposed between the positive and negative elements, means to heat the upper halves of said heat transfer members, said means comprising gas burners positioned on either side of the upper portion of each of said heat transfer members, the rotation of said shaft causing the heated halves of the heat transfer members to contact the positive and negative elements, pins secured to said shaft and spaced 180° apart, a rounded cam-like projection on the frame in the path of the pins and engaged thereby to cause axial movement of said shaft, compressing said elements and lower halves of the heat transfer members together whereby the transfer of heat from the heat members to the elements is effected, causing an electromotive force to be generated.

HERSCHEL G. PACK.

REFERENCES CITED

The following references are of record in the file of this patent:

UNITED STATES PATENTS

| Number | Name | Date |
|---|---|---|
| 985,426 | Marschall | Feb. 28, 1911 |
| 1,618,745 | Adams | Feb. 22, 1927 |
| 1,734,930 | Weaver | Nov. 5, 1929 |
| 2,031,966 | Mathias | Feb. 25, 1936 |

FOREIGN PATENTS

| Number | Country | Date |
|---|---|---|
| 1,357 | Great Britain | of 1883 |
| 8,985 | Great Britain | of 1901 |